United States Patent [19]
Langfahl, Jr.

[11] Patent Number: 6,031,528
[45] Date of Patent: Feb. 29, 2000

[54] USER BASED GRAPHICAL COMPUTER NETWORK DIAGNOSTIC TOOL

[75] Inventor: J. Craig Langfahl, Jr., Phoenix, Ariz.

[73] Assignee: Intel Corporation, Santa Clara, Calif.

[21] Appl. No.: 08/753,243

[22] Filed: Nov. 25, 1996

[51] Int. Cl.[7] ............................... G06F 3/14; G06F 11/30
[52] U.S. Cl. ....................... 345/334; 345/356; 345/969; 709/224
[58] Field of Search ................... 345/334, 335, 345/339, 348, 349, 356, 326, 329, 969, 357; 395/200.33, 200.47, 200.48, 200.75, 200.8; 709/203, 217, 218, 245, 250, 220, 223, 224

[56] References Cited

U.S. PATENT DOCUMENTS

| | | | |
|---|---|---|---|
| 5,226,120 | 7/1993 | Brown et al. | 709/224 |
| 5,261,044 | 11/1993 | Dev et al. | 345/357 |
| 5,295,244 | 3/1994 | Dev et al. | 345/357 |
| 5,353,399 | 10/1994 | Kuwamoto et al. | 345/349 |
| 5,394,522 | 2/1995 | Sanchez-Frank et al. | 345/349 |
| 5,410,754 | 4/1995 | Klotzbach et al. | 370/466 |
| 5,436,909 | 7/1995 | Dev et al. | 714/4 |
| 5,452,415 | 9/1995 | Hotka | 345/329 |
| 5,500,934 | 3/1996 | Austin et al. | 345/326 |
| 5,504,921 | 4/1996 | Dev et al. | 709/223 |
| 5,548,722 | 8/1996 | Jalalian et al. | 709/220 |
| 5,559,955 | 9/1996 | Dev et al. | 714/4 |
| 5,675,756 | 10/1997 | Benton et al. | 345/349 |
| 5,706,455 | 1/1998 | Benton et al. | 364/188 |
| 5,751,965 | 5/1998 | Mayo et al. | 709/224 |
| 5,910,803 | 6/1999 | Grau et al. | 345/357 |

*Primary Examiner*—Crescelle N. dela Torre
*Attorney, Agent, or Firm*—Kenyon & Kenyon

[57] ABSTRACT

A computer network diagnostic tool allows a user of a computer coupled to a computer network to perform network diagnostics. The tool provides a graphical interface which displays the computer coupled to a plurality of computer network entities on the computer network. The interface is adapted to allow the user to select one of the computer network entities. The diagnostic tool then tests the connectivity from the computer to a selected network entity, and the status of the connectivity is graphically displayed.

28 Claims, 5 Drawing Sheets

USER BASED GRAPHICAL COMPUTER NETWORK DIAGNOSTIC TOOL

BACKGROUND OF THE INVENTION

The present invention is directed to a computer network diagnostic tool. More particularly, the present invention is directed to a graphical based network diagnostic tool that enables a computer user to determine the status of data paths on the network in reference to the user's computer.

With the rise of the Internet, many novice computer users for the first time are connecting their computers to a Transmission Control Protocol/Internet Protocol ("TCP/IP") network through a modem or cable adapter. These connections are typically made through a network service provider ("NSP") that provides service through the user's telephone wire or coaxial cable. The user's computer is coupled to an NSP computer server which functions as a gateway to the multitude of remote servers that form the Internet.

Because of the unstructured nature of the Internet, a user will frequently encounter problems while connected to the Internet. For example, a user may desire to receive information that resides on a remote server on the Internet. If the server is not available, the user will not receive the desired information. However, without a diagnostic tool, the user has no way of knowing the cause or the extent of the problem. The novice user may assume that the NSP is the source of the problem, or that the entire Internet is not properly functioning. If the user encounters multiple problems, the user will likely contact their NSP's help desk, which consumes the NSP's time and resources, and results in an added expense for the NSP.

Diagnostic tools are currently available that test the connectivity of a TCP/IP network. For example, Ping and Trace Route are two tools that are included with Windows® 95 and Windows® NT from Microsoft Corporation. However, these tools are non-graphical and require knowledge of specific commands. Further, they do not provide the user with network addresses to test in order to obtain useful information. Therefore, these tools are difficult for the novice user to use.

In addition, network management tools are available that are used by NSPs to provide diagnostic information for a network. Although these tools are frequently graphical, they are designed to be used by network administrators. They typically render maps to depict the structure of the entire network, but not from the perspective of an individual user's computer. In addition, they display technical and sometimes sensitive information about the network that NSPs do not want their subscribers to have. Therefore, these tools are difficult to use and are not intended for the novice user.

Based on the above, there is a need for a network diagnostic tool that is graphical and displays the network from the perspective of the user's computer, and therefore is easy for novice users to troubleshoot problems they are experiencing on the network without resorting to contacting their NSP.

SUMMARY OF THE INVENTION

These and other needs are satisfied by the present invention, which is a network diagnostic tool for allowing a user of a computer coupled to a computer network to perform network diagnostics. The diagnostic tool provides a graphical interface which displays the computer coupled to a plurality of computer network entities on the computer network. The interface is adapted to allow the user to select one of the computer network entities. The diagnostic tool then tests the connectivity from the computer to a selected network entity, and the status of the connectivity is graphically displayed.

DETAILED DESCRIPTION

One embodiment of the present invention, described below, is used with a coaxial cable TCP/IP network system provider. However, other embodiments of the invention can be used with telephone wire TCP/IP network system providers, or any other type of network that can utilize the invention.

Figure 1:
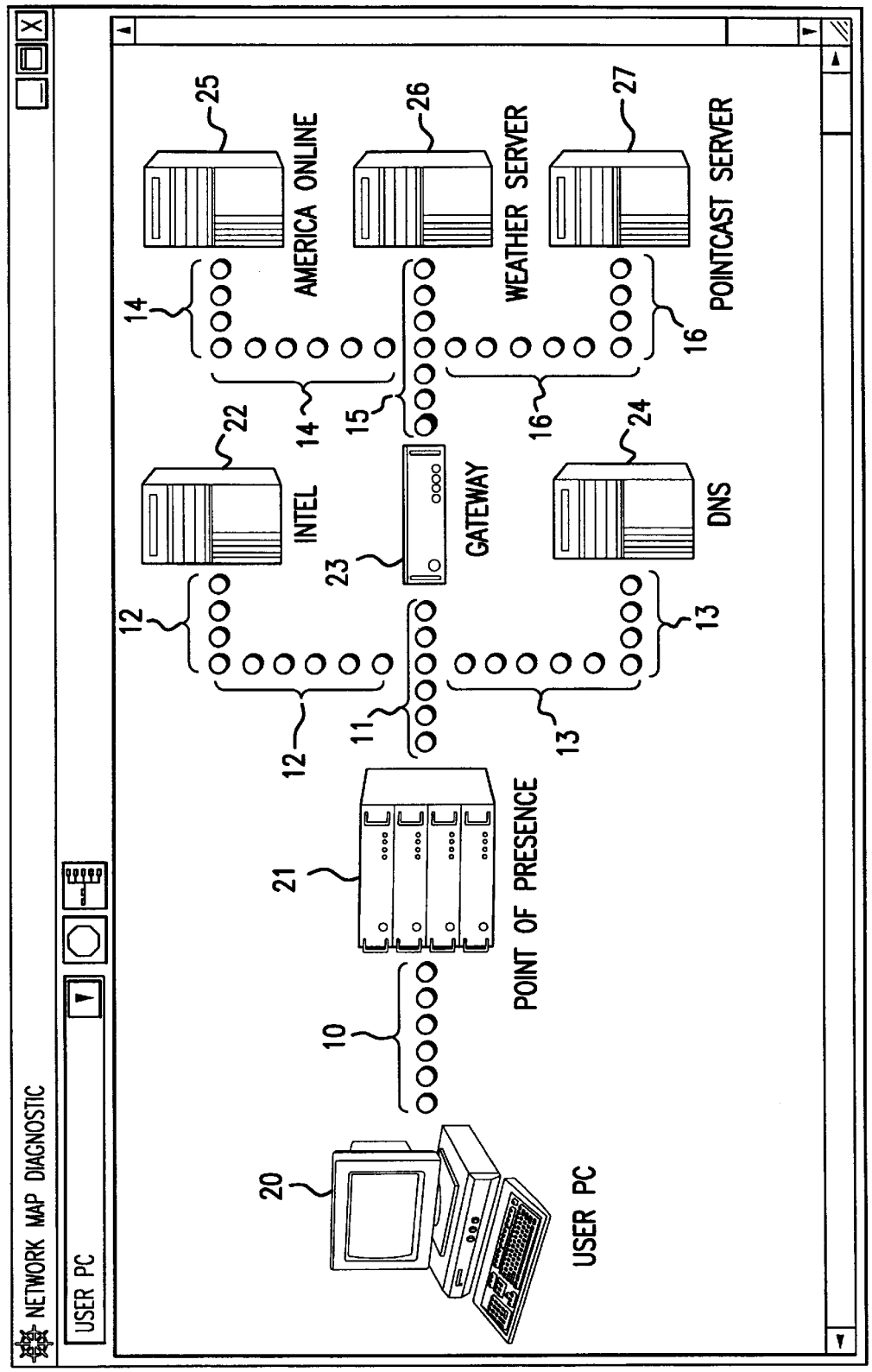
FIG. 1 illustrates an embodiment of a graphical network map in accordance with the present invention.

FIG. 1 illustrates a network map in accordance with one embodiment of the present invention. The network map 30 is a graphical representation of selected portions of the NSP's network from the perspective of the user's computer and provides a user interface to coupled diagnostic routines.

The network map 30 includes graphical representations of various network entities or devices. The User PC 20 represents the user's computer. The Point of Presence 21 represents the head end equipment at the NSP necessary to implement the cable network. Content servers 22, 25–27 represent servers located at the NSP as well as those located on the Internet or other locations. For example, the Intel server 22 is a server located at the NSP. The Weather Server 26 represents a server located on the Internet. Content servers 22, 25–27 can represent any type of servers, from standard World Wide Web servers to specialized service servers.

The DNS server 24 represents the domain name server which is responsible for providing the user's computer with the actual Internet Protocol ("IP") address of alphanumeric host names. Since many services use alphanumeric host names to identify their servers, these services are dependent on the domain name server. The domain name server can be located at the NSP as shown in FIG. 1, or out on the Internet.

The Gateway 23 represents a gateway, which is a device that connects one network on the Internet to another. The Internet includes many gateways. Only the gateways directly connected to Point of Presence 21 of the NSP are represented on network map 30. In the embodiment illustrated in FIG. 1, there is only one gateway connected to the point of presence at the NSP.

Other network entities, not shown on network map 30, may be displayed if desired. For example, if a cable adapter or modem has its own IP address, it can be included on the map 30. Different graphics can be displayed for internal and external cable adapters.

All of the devices on network map 30 are connected by graphical links 10–16. The links graphically indicate four states: untested, testing, test successful, and test failed. Different colors or shades of grey may be used to indicate the different states. For example, in the untested state the links are grey. The untested state is the initial state of network map 30. The testing state is a flashing of the links (e.g., a flashing green) that form a connection from User PC 20 to a selected device. If a connection is established to the device, the links become green, for example. If a connection cannot be established, the links become red, for example. If the disconnected device has some of the same path links with a successfully connected device, only the deviations from the same path links will show as disconnected (e.g., red). Other color schemes are possible, and the flashing could be replaced by a color, e.g., yellow to indicate testing.

A user tests the connectivity to any graphically represented device from their computer by selecting one of the devices on network map 30. A selection module in the present invention allows the user to select one of the devices in a variety of ways, and links the selected device to an underlying diagnostic routine. The functionality described herein for selecting one of the devices is well known. To select a device, the user can either select from a drop down menu box that lists the devices, or click on the actual graphic representation of the device using a mouse. The selection module extracts the IP address for the selected device from the file used to create network map 30. The connection to the selected device will then be tested, and the links between the user's computer, or User PC 20, and the selected device will display the results.

For example, if the user clicks on Weather Server 26, the path from User PC 20 to Weather Server 26, which consists of graphical links 10, 11 and 15, would switch from grey to flashing green. If a connection from User PC 20 to Weather Server 26 is established, the path becomes green. If a connection from User PC 20 to Weather Server 26 cannot be established, the path becomes red.

The drop down menu box also includes an option to test all the devices. If this option is chosen, all of the connections between the user's computer and the network entities displayed on network map 30 will be tested.

Network map 30 requires animation to display the different states of the links and the computer graphics. The function of clicking on the graphical representation of the device requires a graphical hit testing engine for the network map. Information on how to design network map 30 is disclosed, for example, in Thompson, Nigel, *Animation Techniques in Win*32, Microsoft Press (1995), incorporated herein by reference. Network map 30 is formed by using computer sprite tiles for each network entity and for portions of the links. A CD-ROM that includes sample code is included with *Animation Techniques in Win*32. Some of this sample code provides information on non-rectangular hit testing, sprite animation and Z ordering of sprites. The final code used to create network map 30 is based on the sample code.

The placement of devices and the creation of their IP addresses on network map 30 is performed by the NSP. The NSP creates a data file which allows the user's computer to create network map 30. The data file includes the IP addresses. The user automatically downloads updated network maps 30 in file form from the network. Therefore, the NSP can easily update all users when changes are made to the network.

The network diagnostic tool of the present invention interfaces with known IP diagnostic routines to test connectivity. Suitable IP diagnostic routines are typically included with the operating system of the computer that is running the network diagnostic tool. The implementation of these IP diagnostic routines is dependent on the networking application programming interface ("API") for the operating system.

Figure 2:
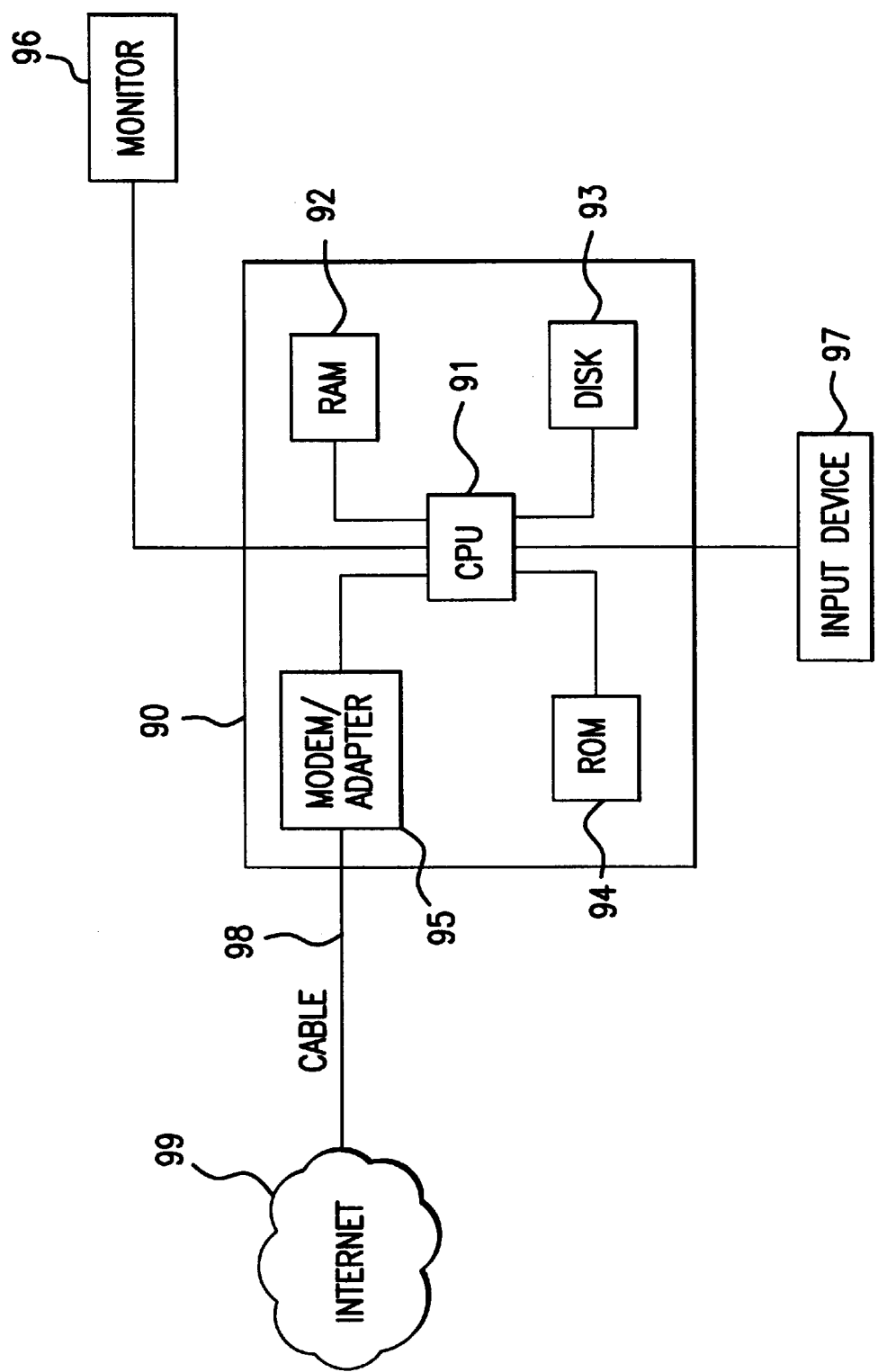
FIG. 2 illustrates an embodiment of a computer for implementing the present invention.

FIG. 2 illustrates an embodiment of the network diagnostic tool of the present invention implemented using a personal computer. The personal computer 90 includes a processor ("CPU") 91 for executing software and controlling attached devices. In one embodiment, CPU 91 is the Pentium® or Pentium® Pro microprocessor from Intel Corporation. Coupled to CPU 91 is a random access memory ("RAM") 92, a disk drive 93, and a read only memory ("ROM") 94. These devices store software and data. Also coupled to CPU 91 is a monitor 96 for displaying information, such as network map 30, and an input device 97, e.g., a keyboard or mouse. In addition, a modem or adapter 95 couples CPU 91 to a coaxial cable 98 or phone line which is coupled to the Internet 99.

In one embodiment, computer 90 uses Windows® 95 or Windows® NT as an operating system. These operating systems include the Ping diagnostic routine. In this embodiment, both the operating system and the steps that perform the function of the network diagnostic tool of the present invention are stored on disk drive 93 and in the RAM 92.

Ping uses the Internet Control Message Protocol ("ICMP") echo feature that is in all TCP/IP stacks. A machine sends an ICMP echo request packet to a target machine and the target machine or some other machine en route to the target responds with an ICMP echo response packet. Ping and the ICMP are disclosed in, for example, Stevens, W. Richard, *TCP/IP Illustrated, Volume* 1, *The Protocols*, Addison-Wesley Publishing Co. (1994), pp. 69–76, incorporated herein by reference.

Normally, Ping is implemented using sockets. The Windows Sockets (WinSock) software in Windows® 95 and Windows® NT, however, does not support the type of socket (SOCK_RAW) that is required to perform ICMP operations. Instead, Windows® 95 and Windows® NT has a special ICMP API. Information about the Windows ICMP API is disclosed in computer files entitled "icmpapi.h", "ipexport.h", and "icmp.lib" that are found on CD-ROM disk number 6 of the Win32 Software Developers Kit which is part of The Microsoft Developer Network CD-ROMs from Microsoft Corporation (July, 1996), incorporated herein by reference. The ICMP API uses WIN32 file handles and blocking function calls. These blocking function calls have to be performed in a separate thread from network map 30 or network map 30 will appear to hang or freeze while the blocking operation is in progress. The WinSock API, however, contains functions to convert character strings into network addresses. These WinSock calls are asynchronous and require a Window.

Figure 3:
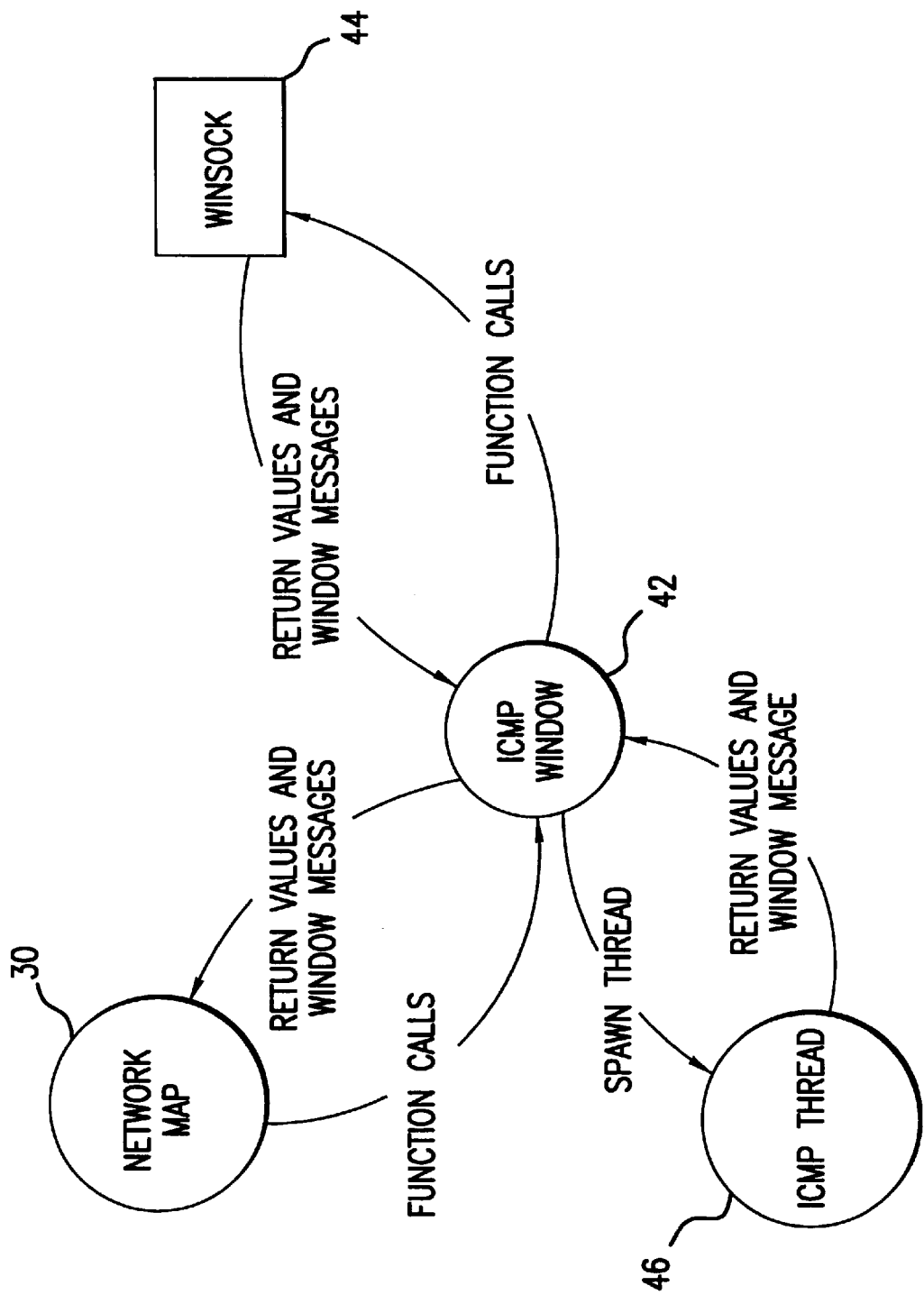
FIG. 3 is a flow diagram showing the interface between the embodiment of the network map of FIG. 1 and an IP diagnostic routine.

FIG. 3 is a flow diagram illustrating the interface between network map 30 and its underlying IP diagnostics. This interface is performed by the selection module of the present invention. In FIG. 3, when a network entity is selected by a user, network map 30 makes a function call with the network entity IP address string into the IP diagnostics API. The API creates an ICMP Window 42 that controls the operation. If the API function call is blocking, ICMP Window 42 will run modally and take control of the program. If the API function called is asynchronous, the function will return immediately and status information will be sent to the calling program through Window messages.

ICMP Window 42 uses several WinSock 44 function calls to convert the network entity IP address string into a valid IP address. If the address string is successfully converted, the ICMP Window 42 spawns an ICMP Thread 46 for each series of echo requests that have to be sent to the same device. ICMP Thread 46 sends Window messages to the ICMP Window 42 to indicate the status of each echo request. The Window messages also indicate the success or failure of each echo request. Network map 30 uses the Window messages to update graphical links 10–16. When the echo requests are complete, the ICMP Window 42 destroys the thread and then close itself.

Figure 4:
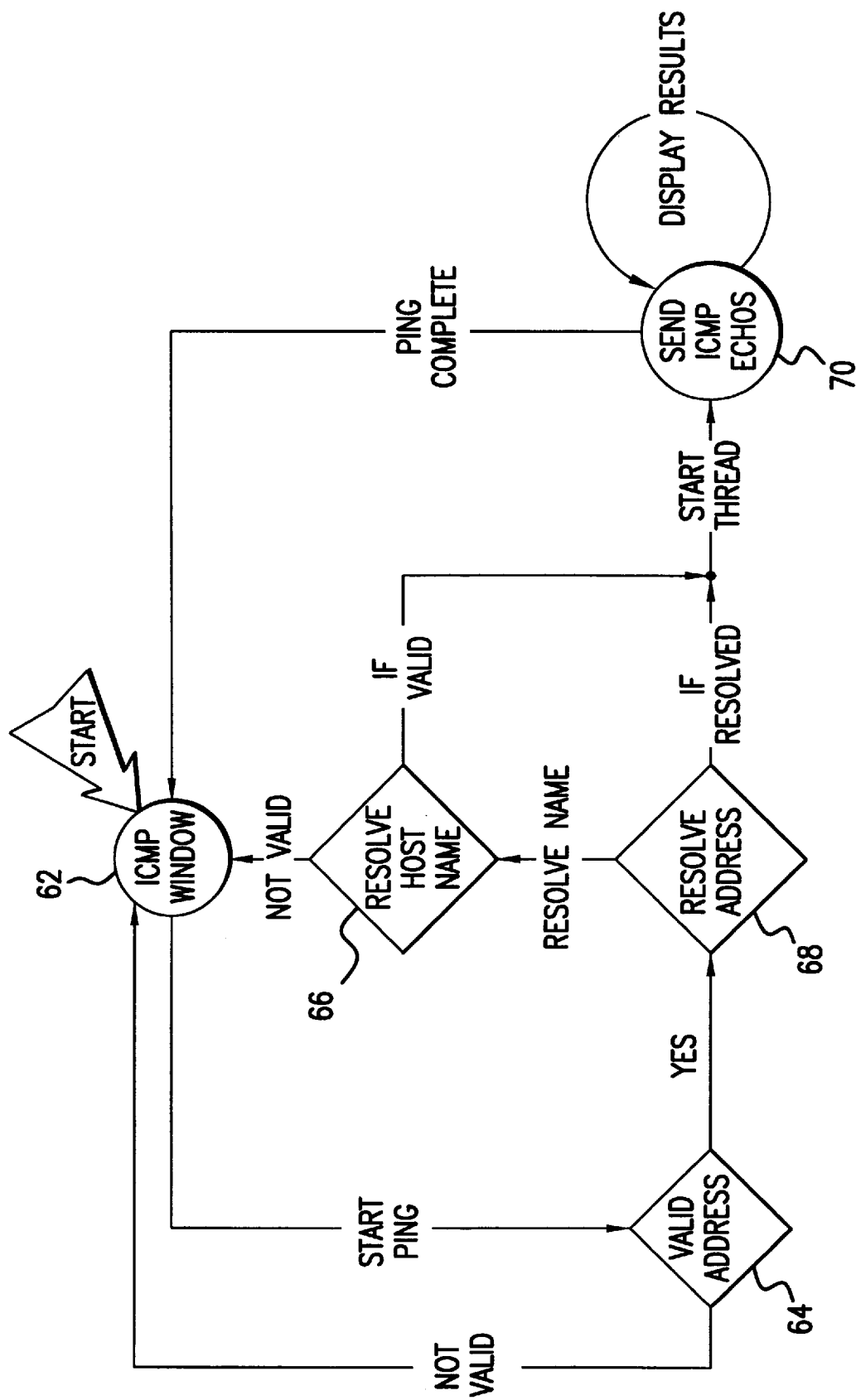
FIG. 4 is a flow diagram of the steps performed when a network entity is selected on the embodiment of the network map of FIG. 1 and the Ping diagnostic routine is used.

FIG. 4 is a flow diagram illustrating the steps performed by the selection module in an embodiment of the present invention when the Ping diagnostic routine is used and a network entity is selected by the user on network map 30. First, at step 62, the ICMP Window is created and Ping is started. Then, at step 64, the network entity address string is checked to make sure it is valid. At step 68 WinSock is used to determine if the network entity address string contains an alphanumeric host name that must be resolved to an IP address using a Domain Name Server ("DNS") lookup. A DNS lookup is performed at step 66, if necessary, and the ICMP Window creates the thread to do the ICMP echo requests. Optionally, a DNS lookup can be performed to get the alphanumeric host name for a network entity address string containing numeric IP addresses before the ICMP thread is created. The ICMP thread sends a series of echo requests at step 70. When all the echo requests are complete, the thread terminates and the Ping is complete. Ping only requires one series of echo requests. Therefore only one ICMP thread is created for each Ping.

Figure 5:
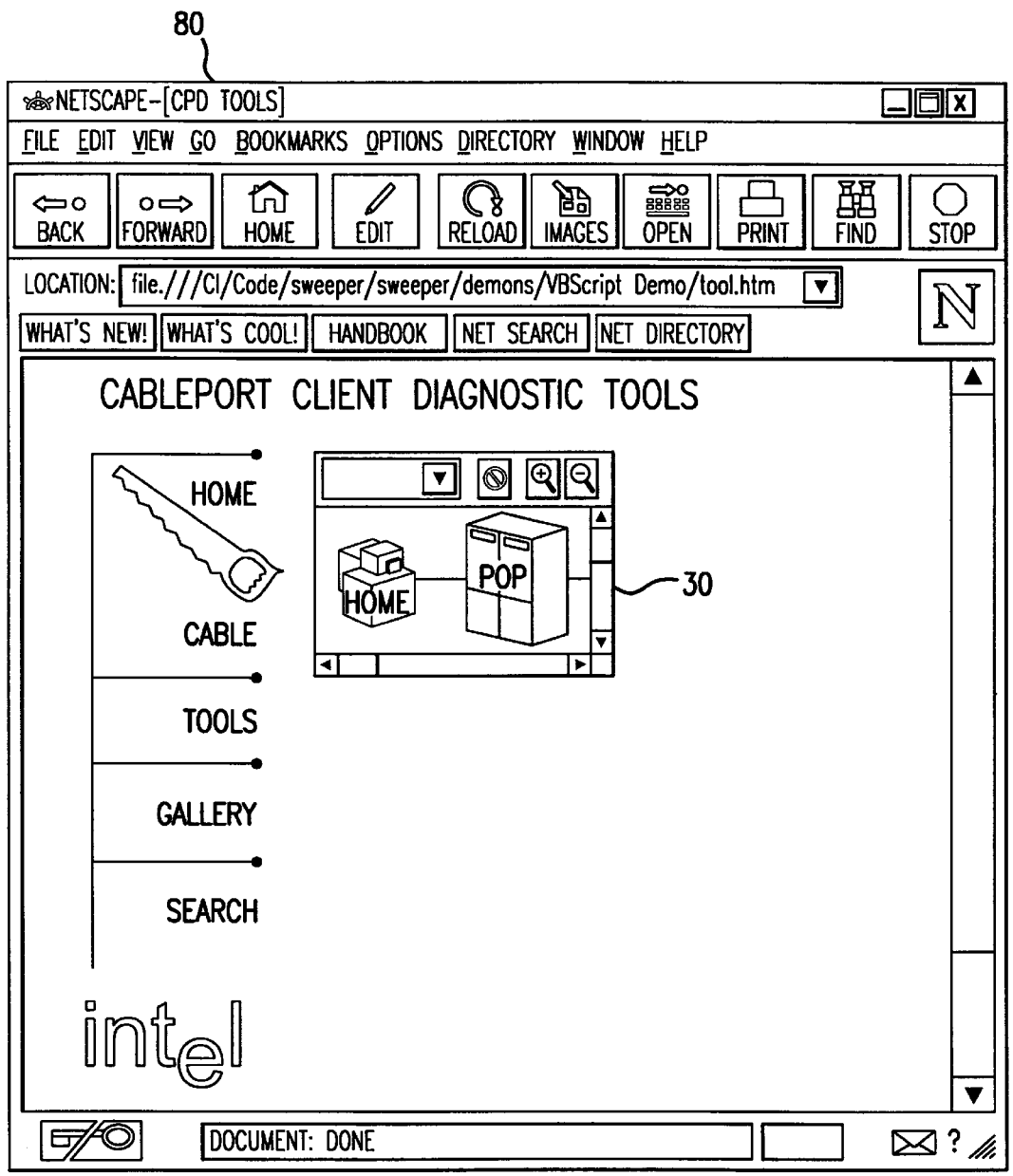
FIG. 5 illustrates an embodiment of the network map embedded in another application.

In a further embodiment of the present invention, network map 30 and its underlying IP diagnostic routines are embedded in other applications running on the user's computer using an embedding routine. In one embodiment, the embedding routine used is Active X software from Microsoft Corp. Active X uses the Component Object Model (COM) technology that is built into the Windows operating systems to embed applets in place into applications. These embedded applets are called Active X controls. For example, FIG. 5 shows an embedded network map 30 (with the size of the window shrunk in comparison with network map 30 shown in FIG. 1) in a Hypertext Markup Language ("HTML") page 80 of a web browser using Active X. Other software programs that allow embedded applications, such as Java, may also be used.

As described, embodiments of the present invention provide a graphical network map 30 which displays network entities in relation to a user's computer. Network map 30 does not create a security risk to the NSPs by showing exactly how the network is implemented. The only information network map 30 discloses is the name, IP address, and basic function of the displayed network entities. Further, the limited information on network map 30 is less confusing to novice users than a network map that includes technical information about the network.

Network map 30 enables users to obtain basic information such as isolating problems to particular network entities and the distinction between Internet problems and cable adapter network problems. By isolating problems to a particular network entity, network map 30 can illustrate that even though a particular network entity is unreachable, the rest of the cable adapter services may still operate normally. In addition, by distinguishing between Internet problems and cable adapter problems, network map 30 can show the user the difference between genuine problems at the cable plant and temporary traffic problems or server outages on the Internet that the NSP cannot control. This will allow the NSP's resources to be better allocated to solving actual NSP problems.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A network map diagnostic tool operated by a user of a computer coupled to a computer network interface server, wherein said computer network interface server is coupled to a plurality of computer network entities on a computer network, said diagnostic tool comprising:

a configuration file generated at said computer network interface server, said configuration file comprising a network address for each of said computer network entities and graphical data for depicting and positioning said computer network entities and said computer on a display;

means for retrieving said configuration file from said computer network interface server;

a graphical interface which graphically displays the computer coupled to said plurality of computer network entities on the computer network from a perspective of said computer, wherein said graphical interface is generated at said computer based on said configuration file and includes a first graphical coupling that couples the computer directly to a first network entity and a second graphical coupling that couples the first network entity directly to a second network entity;

means for allowing the user to select said second network entity;

means for testing the connectivity from the computer to said second network entity; and means for graphically displaying a status of said connectivity using the first graphical coupling to display the status of the connection between the computer and the first network entity and using the second graphical coupling to display the status of the connection between the first network entity and the second network entity, wherein the information in said configuration file is limited to maintain network security.

2. The network map diagnostic tool of claim 1, further comprising:

means for determining the network address of said selected network entity.

3. The network map diagnostic tool of claim 2, wherein said means for graphically displaying comprises graphical links which vary in color.

4. The network map diagnostic tool of claim 3, wherein said status comprises:

untested; testing; test successful; and test failed.

5. The network map diagnostic tool of claim 2, wherein said means for testing comprises a network diagnostic routine coupled to said graphical interface.

6. The network map diagnostic tool of claim 5, wherein said network is a Transmission Control Protocol/Internet Protocol network and said network diagnostic routine is Ping.

7. The network map diagnostic tool of claim 2, further comprising:

means for embedding said graphical interface in a computer application program.

8. The network map diagnostic tool of claim 1, wherein said computer network is an Internet, and said network address is an Internet Protocol address.

9. The network map diagnostic tool of claim 1, wherein said means for graphically displaying comprises flashing graphical links while said connectivity is being tested.

10. A method of allowing a user of a computer coupled to a computer network to perform network diagnostics, said method comprising the steps of:

(a) retrieving from a computer network interface server coupled to the computer a configuration file generated at said computer network interface server, said configuration file comprising a network address for each of said computer network entities and graphical data for depicting and positioning said computer network entities and said computer on a display;

(b) providing a graphical interface based on said configuration file which displays the computer coupled to a plurality of computer network entities on the computer network, said interface adapted to allow the user to select one of said computer network entities, wherein said interface includes a first graphical coupling that couples the computer directly to a first network entity, and a second graphical coupling that couples the first network entity directly to a second network entity;

(c) testing the connectivity from the computer to the second network entity by selecting the second network entity; and (d) graphically displaying a status of said connectivity using the first graphical coupling to display the status of said connection between the computer and the first network entity and using the second graphical coupling to display the status of the connection between the first network entity and the second network entity.

11. The method of claim 10, further comprising the step of:

(e) determining the network address of said selected network entity.

12. The method of claim 11, wherein said step (d) comprises the step of displaying graphical links which vary in color.

13. The method of claim 12, wherein said status comprises:

untested; testing; test successful; and test failed.

14. The method of claim 11, wherein said step (c) comprises the step of running a network diagnostic routine coupled to said graphical interface.

15. The method of claim 14, wherein said network is a Transmission Control Protocol/Internet Protocol network and said network diagnostic routine is Ping.

16. The method of claim 11, further comprising the step of:

(f) embedding said graphical interface in a computer application program.

17. A computer program embodied on a computer-readable medium for allowing a user of a computer coupled to a computer network interface server to perform network diagnostics, wherein said computer network interface server is coupled to a plurality of computer network entities, said computer program comprising:

a retrieving module for retrieving a configuration file generated at said computer network interface server, said configuration file comprising a network address for each of said computer network entities and graphical data for depicting and positioning said computer network entities and said computer on a display;

a display module that generates and displays based on said configuration module a graphical interface of the computer coupled to said plurality of computer network entities, from a perspective of the computer, on the computer network wherein said graphical interface includes a first graphical coupling that couples the computer directly to a first network entity and a second graphical coupling that couples the first network entity directly to a second network entity;

a selection module that enables the user to select said second network entity; and a diagnostic routine interfaced with said selection module that determines a status of the connectivity from the computer to said second network entity, said diagnostic routine being further interfaced with said graphical interface so that said status is displayed on said graphical interface using the first graphical coupling to display the status of the connection between the computer and the first network entity and using the second graphical coupling to display the status of the connection between the first network entity and the second network entity, wherein the information in said configuration file is limited to maintain network security.

18. The computer program of claim 17, wherein said selection module determines the network address of said selected network entity.

19. The computer program of claim 18, wherein said graphical interface displays said status by displaying graphical links.

20. The computer program of claim 19, wherein said status comprises untested, testing, test successful, and test failed, and said graphical links vary in color to display said status.

21. The computer program of claim 20, wherein said computer network is a Transmission Control Protocol/Internet Protocol network and said diagnostic routine is Ping.

22. The computer program of claim 17, further comprising:

an embedding routine for embedding said graphical interface in a computer application program.

23. A computer coupled to a computer network for performing network diagnostics, said computer comprising:

a processor;

a storage device coupled to said processor; and an input device coupled to said processor;

wherein said processor is programmed to:

(a) retrieving from a computer network interface server coupled to the computer a configuration file generated at said computer network interface server, said configuration file comprising a network address for each of said computer network entities and graphical data for depicting and positioning said computer network entities and said computer on a display device;

(b) graphically display on a display device based on said configuration file a graphical interface of the computer coupled to a plurality of computer network entities on the computer network from a perspective of the computer, wherein said interface includes a first graphical coupling that couples the computer directly to a first network entity, and a second graphical coupling that couples the first network entity directly to a second network entity;

(c) enable the second network entity to be selected with said input device;

(d) determine a status of the connectivity from the computer to the second network entity; and (e) graphically display on the display device said status using the first graphical coupling to display the status of the connection between the computer and the first network entity and using the second graphical coupling to display the status of the connection between the first network entity and the second network entity.

24. The computer of claim 23, wherein said processor is programmed to determine the network address of said selected network entity.

25. The computer of claim 24, wherein said processor is programmed to display said status by displaying a graphical link between the computer and said selected network entity.

26. The computer of claim 25, wherein said status comprises untested, testing, test successful, and test failed, and said graphical links vary in color to display said status.

27. The computer of claim 26, wherein said computer network is a Transmission Control Protocol/Internet Protocol network and said diagnostic routine is Ping.

28. The computer of claim 23, wherein said processor is programmed to embed said graphical display in a computer application program.

* * * * *